United States Patent
Lai et al.

(10) Patent No.: US 7,890,564 B2
(45) Date of Patent: Feb. 15, 2011

(54) INTERPOLATION FIR FILTER AND METHOD THEREOF

(75) Inventors: Yao-Hung Lai, Sinshih Township (TW); Chih-Fu Lee, Sinshih Township (TW)

(73) Assignee: Himax Technologies Limited, Shinshih Township (TW)

( * ) Notice: Subject to any disclaimer, the term of this patent is extended or adjusted under 35 U.S.C. 154(b) by 1052 days.

(21) Appl. No.: 11/668,701

(22) Filed: Jan. 30, 2007

(65) Prior Publication Data

US 2008/0183789 A1 Jul. 31, 2008

(51) Int. Cl.
*G06F 17/10* (2006.01)
(52) U.S. Cl. ..................................... 708/313
(58) Field of Classification Search ............... None
See application file for complete search history.

(56) References Cited

U.S. PATENT DOCUMENTS

| | | | | |
|---|---|---|---|---|
| 5,471,411 A | * | 11/1995 | Adams et al. | 708/300 |
| 5,729,483 A | * | 3/1998 | Brown | 708/313 |
| 5,732,004 A | * | 3/1998 | Brown | 708/319 |
| 6,052,701 A | * | 4/2000 | Koslov et al. | 708/313 |
| 6,915,319 B1 | * | 7/2005 | Sato | 708/313 |
| 7,698,355 B2 | * | 4/2010 | Bhuvanagiri et al. | 708/313 |
| 2002/0075953 A1 | * | 6/2002 | Lim et al. | 375/232 |

* cited by examiner

*Primary Examiner*—David H Malzahn

(57) ABSTRACT

An interpolation FIR filter uses a coefficient to generate an interpolation value of a first and second input value. The interpolation FIR filter has several arithmetic units, an adder, and a divider. The $n^{th}$ arithmetic unit outputs a partial product by selecting one of the first and second input values according to an $n^{th}$ bit of the coefficient, and multiplying the selected input value by $2^{(n-1)}$. The adder outputs a sum all the partial products and the first input value. The divider divides the sum by $2^m$, wherein m is an amount of the arithmetic units.

14 Claims, 3 Drawing Sheets

```
      AAAAAA                    BBBBBB
    X 101010                  X 010101
      000000                    BBBBBB
    AAAAAA                    000000
      000000                    BBBBBB
    AAAAAA              +     000000
      000000                    BBBBBB
    AAAAAA                    000000

||

BBBBBB
                            AAAAAA
                              BBBBBB
                            AAAAAA
                              BBBBBB
                            AAAAAA
```

Fig. 3

INTERPOLATION FIR FILTER AND METHOD THEREOF

BACKGROUND

1. Field of Invention

The present invention relates to an interpolation FIR filter, and more particularly relates to an interpolation FIR filter used in a scaling engine.

2. Description of Related Art

The polyphase FIR (Finite Impulse Response) filter is the key component of the scaling engine. The scaling engine is applied on the image processing to optimize the image. Therefore, the FIR filter is arranged to deal with the pixel of an image. The traditional FIR filter is operated according to the equation described bellow:

$$\text{pixel}=[(\text{pixel } A)\times(\text{coefficient } A)+(\text{pixel } B)\times(\text{coefficient } B)]/2^m \quad (1)$$

wherein the 'pixel' is the new pixel value of the processing pixel after the FIR filter's operation;

the 'pixel A' is the pixel value of the first pixel next to the processing pixel;

the 'pixel B' is the pixel value of the second pixel next to the processing pixel;

the 'coefficient A' is the interpolation coefficient of the 'pixel A';

the 'coefficient B' is the interpolation coefficient of the 'pixel B'; and the interpolation coefficient is a m-bit binary number.

FIG. 1 is an interpolation FIR filter of the prior art. The traditional FIR filter operated according to the equation described above has two multipliers 110 and 120, an adder 130, and a divider 140. The multiplier 110 deals with the pixel value of pixel A and coefficient A; and the multipliers 120 deals with the pixel value of pixel B and coefficient B. Therefore, the traditional FIR filter needs two memory devices (such as ROM) to store this interpolation coefficient A and coefficient B.

The ROM tables stored the interpolation coefficients are big parts of the traditional FIR filter. Therefore, a FIR filter with fewer memory devices is needed.

SUMMARY

According to one embodiment of the present invention, the interpolation FIR filter uses a coefficient to generate an interpolation value of a first and second input value. The interpolation FIR filter has several arithmetic units, an adder, and a divider. The $n^{th}$ arithmetic unit outputs a partial product by selecting one of the first and second input values according to an $n^{th}$ bit of the coefficient, and multiplying the selected input value by $2^{(n-1)}$. The adder outputs a sum of all the partial products and the first input value. The divider divides the sum by $2^m$, wherein m is an amount of the arithmetic units.

According to another embodiment of the present invention, the interpolation FIR method uses a coefficient to generate an interpolation value of a first and second input value. The interpolation FIR method includes obtaining several partial products by selecting one of the first and second input values according to an $n^{th}$ bit of the coefficient, and multiplying the selected input value by $2^{(n-1)}$. The method also includes outputting a sum of all the partial products and the first input value, and dividing the sum by $2^m$, wherein m is an amount of the arithmetic units.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 3 is a scheme indicating the operation of the interpolation FIR filter according to the embodiment of the present invention.

DESCRIPTION OF THE PREFERRED EMBODIMENTS

Figure 1:
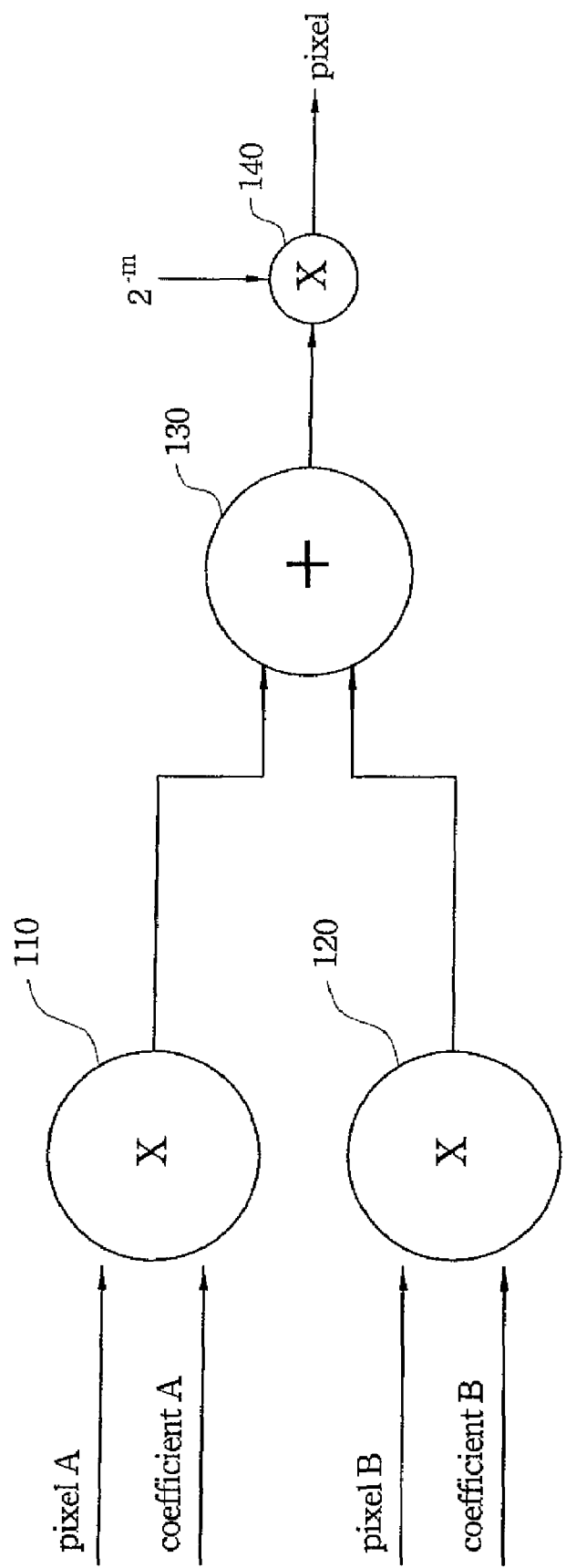
FIG. 1 is an interpolation FIR filter of the prior art.

Reference will now be made in detail to the present preferred embodiments of the invention, examples of which are illustrated in the accompanying drawings. Wherever possible, the same reference numbers are used in the drawings and the description to refer to the same or like parts.

From the equation (1) above, the coefficient A and coefficient B are positive, and can be normalized by setting the coefficient A and the coefficient B as "one's complements" to each other, therefore:

$$\text{coefficient } A+\text{coefficient } B=2^m$$

Thus, the FIR filter's equation can be transformed to be:

$$\text{pixel}=\{\text{pixel } A+[(\text{pixel } A)\times((2^m-1)-\text{coefficient } B)+(\text{pixel } B)\times(\text{coefficient } B)]\}/2^m \quad (2)$$

The FIR filter of the invention's embodiment deals with only one coefficient (i.e. coefficient B) thereby.

Figure 2:
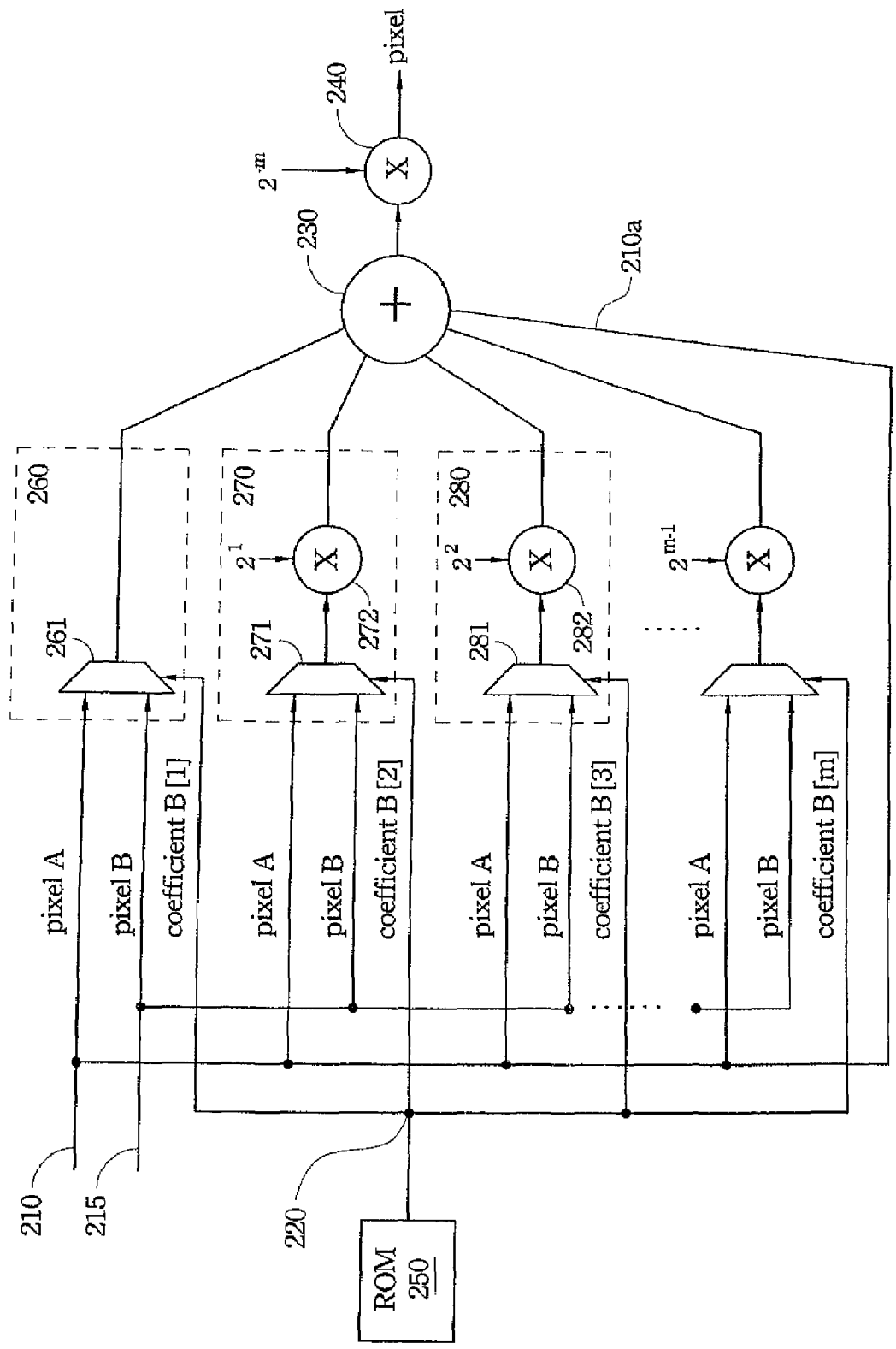
FIG. 2 is an interpolation FIR filter according to one embodiment of the present invention.

FIG. 2 is an interpolation FIR filter according to one embodiment of the present invention. The interpolation FIR filter uses a coefficient to generate an interpolation value of a first and second input value. The interpolation FIR filter has several arithmetic units, an adder 230, and a divider 240. The $n^{th}$ arithmetic unit outputs a partial product by selecting one of the first and second input values according to an $n^{th}$ bit of the coefficient, and multiplying the selected input value by $2^{(n-1)}$. The adder 230 outputs a sum of all the partial products and the first input value (transmitted by line 210a). The divider 240 divides the sum by $2^m$, wherein m is an amount of the arithmetic units.

The coefficient inputted to the arithmetic units is the value expresses by an m-bit binary number. For example, the coefficient (transmitted by line 220) inputted to the arithmetic units is a 3-bit binary number. The first input value is transmitted by line 210, and the second input value is transmitted by line 215. The interpolation FIR filter has three arithmetic units 260, 270 and 280, an adder 230, and a divider 240. The 1st, 2nd, and 3rd arithmetic units 260, 270 and 280 respectively outputs a partial product by selecting one of the first and second input values according to 1st, 2nd, and 3rd bit respectively of the coefficient.

Namely, the 1st, 2nd, and 3rd arithmetic units 260, 270 and 280 respectively outputs one of the pixel A and pixel B according to the bits of coefficient B[1], coefficient B[2], and coefficient B[3]. The arithmetic units 270 and 280 then respectively shift the selected input value by 1 bit and 2 bits. The adder 230 outputs a sum of the selected input value from the $1^{st}$ arithmetic unit 260, the partial products from the $2^{nd}$, and $3^{rd}$ arithmetic units 270 and 280, and the first input value (transmitted by line 210a). The divider 240 divides the sum by $2^3$. The bit number of the coefficient can be increased according to the resign requirement, such as the m-bit coefficient shown in the FIG. 2.

The interpolation FIR further has a memory 250 to store the coefficient. The memory 250 can be any kind of ordinary memory, such as read only memory (ROM). The bits of the coefficient are respectively transmitted from the memory 250 to the arithmetic units 260, 270 and 280.

The arithmetic units have several multiplexers for selection of the input values. Namely, the arithmetic unit 260, 270 and 280 respectively has the multiplexer 261, 271, and 281 to select the input values. Meanwhile, the arithmetic units have several shift registers to respectively shift the selected input values by (n−1) bits for multiplying the selected input values. Therefore, the arithmetic unit 270 and 280 respectively has the shift registers 272 and 282 to shift the selected input values.

Therefore, the method to operate the interpolation FIR filter of the invention uses a coefficient to generate an interpolation value of a first and second input value. The interpolation FIR method includes obtaining several partial products by selecting one of the first and second input values according to an $n^{th}$ bit of the coefficient, and multiplying the selected input value by $2^{(n-1)}$. The method also includes outputting a sum of all the partial products and the first input value, and dividing the sum by $2^m$, wherein m is an amount of the arithmetic units.

FIG. 3 is a scheme indicating the operation of the interpolation FIR filter according to the embodiment of the present invention. Take an example of the coefficient of 6-bit binary number. From the equation (2) and the method described above, the first input value (i.e. pixel A) is 'AAAAAA', the second input value (i.e. pixel B) is 'BBBBBB'; the coefficient (i.e. coefficient B) is '010101'; and the one's complement of the coefficient (i.e. (2m−1)−coefficient B) is '101010'. Therefore, the equation (2) becomes:

$$\text{pixel} = \{\text{'}AAAAAA\text{'} + [(\text{'}AAAAAA\text{'} \times \text{'}101010\text{'}) + (\text{'}BBBBBB\text{'} \times \text{'}010101\text{'})]\} \quad (3)$$

Refer to the FIG. 2; the equation (3) needs the multiplexers to repetitively select one of the first and second input values (i.e. 'AAAAAA' and 'BBBBBB') according to each bit of the coefficient B (i.e. '010101'). The equation (3) also needs the shift registers to repetitively shift the selected input value by different bits. Then, the equation (3) needs the adder summing the selected and shifted input values, and a divider dividing the sum by $2^6$ to generate the new pixel value.

Therefore, the embodiments presented here just needs one coefficient to apply on the interpolation FIR filter. The memory required by the interpolation FIR filter is reduced. Otherwise, the invention presented here uses "one's complements" to get the equation (2). In the equation (2), the embodiments of the invention output the sum of all the partial products and the first input value that is used to do the correction of this one's complements multiplier.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An interpolation FIR filter generating an interpolation value of a first and second input value using a coefficient, the interpolation FIR filter comprising:
    a plurality of arithmetic units, wherein the $n^{th}$ arithmetic unit is configured to output a partial product by selecting one of the first and second input values according to an $n^{th}$ bit of the coefficient, and multiplying the selected input value by $2^{(n-1)}$;
    an adder for outputting a sum of all the partial products and the first input value; and
    a divider for dividing the sum by $2^m$, wherein m is an amount of the arithmetic units.

2. The interpolation FIR filter as claimed in claim 1, wherein the coefficient is an m-bit binary number.

3. The interpolation FIR filter as claimed in claim 1, further comprising a memory to store the coefficient.

4. The interpolation FIR filter as claimed in claim 1, wherein the arithmetic units have a plurality of multiplexers for selection of the input values.

5. The interpolation FIR filter as claimed in claim 1, wherein the arithmetic units have a plurality of shift registers to respectively shift the selected input values by (n−1) bits for multiplying the selected input values.

6. The interpolation FIR filter as claimed in claim 1, wherein the interpolation FIR filter is used in an image-scaling engine.

7. The interpolation FIR filter as claimed in claim 6, wherein the first and second input values are pixel values.

8. An interpolation FIR method generating an interpolation value of a first and second input value using a coefficient, the interpolation FIR method comprising:
    obtaining a plurality of partial products by operation of a plurality of arithmetic units by selecting one of the first and second input values according to an $n^{th}$ bit of the coefficient, and multiplying the selected input value by $2^{(n-1)}$;
    outputting a sum of all the partial products and the first input value; and
    dividing the sum by $2^m$, wherein m is an amount of the arithmetic units.

9. The interpolation FIR method as claimed in claim 8, wherein the coefficient is an m-bit binary number.

10. The interpolation FIR method as claimed in claim 8, further comprising storing the coefficient in a memory.

11. The interpolation FIR method as claimed in claim 8, wherein selecting one of the first and second input values according to the $n^{th}$ bit of the coefficient is implemented by a plurality of multiplexers.

12. The interpolation FIR method as claimed in claim 8, wherein multiplying the selected input value is implemented by a plurality of shift registers to respectively shift the selected input values by (n−1) bits.

13. The interpolation FIR method as claimed in claim 8, wherein the interpolation FIR method is used in an image-scaling engine.

14. The interpolation FIR method as claimed in claim 13, wherein the first and second input values are pixel values.

* * * * *